US012454976B2

(12) United States Patent
Ito

(10) Patent No.: US 12,454,976 B2
(45) Date of Patent: Oct. 28, 2025

(54) RECIPROCAL FITTING SYSTEM

(71) Applicant: EMILY TIEMY ITO—ME, São José dos Pinhais (BR)

(72) Inventor: Emily Tiemy Ito, São José dos Pinhais (BR)

(73) Assignee: Emily Tiemy Ito-Me, São José dos Pinhais (BR)

( * ) Notice: Subject to any disclaimer, the term of this patent is extended or adjusted under 35 U.S.C. 154(b) by 223 days.

(21) Appl. No.: 17/616,431

(22) PCT Filed: Mar. 31, 2020

(86) PCT No.: PCT/BR2020/050109
§ 371 (c)(1),
(2) Date: Dec. 3, 2021

(87) PCT Pub. No.: WO2020/243803
PCT Pub. Date: Dec. 10, 2020

(65) Prior Publication Data

US 2022/0235807 A1 Jul. 28, 2022

(30) Foreign Application Priority Data

Jun. 4, 2019 (BR) ......................... 102019011559-9
Oct. 30, 2019 (BR) ......................... 102019022786-9

(51) Int. Cl.
*F16B 21/06* (2006.01)
*A63H 33/08* (2006.01)

(52) U.S. Cl.
CPC ........... *F16B 21/06* (2013.01); *A63H 33/086* (2013.01); *A44D 2200/12* (2013.01); *Y10S 24/38* (2013.01)

(58) Field of Classification Search
CPC ........ F16B 21/06; F16B 21/075; F16B 5/126; A63H 33/086; A63H 33/08; B65D 21/0204; Y10S 24/38; A44B 11/25; A44B 11/258; A44B 17/0023; A44B 17/0029; A44B 17/0035; A44B 17/0041; A44B 17/0064; A44B 17/007; A44B 17/0076; Y10T 24/45225; Y10T 24/45257; A44C 5/20;
(Continued)

(56) References Cited

U.S. PATENT DOCUMENTS 2,800,743 A * 7/1957 Meehan ............... A63H 33/084 446/127
3,374,917 A 3/1968 Troy
(Continued)

FOREIGN PATENT DOCUMENTS

FR 2274329 A1 1/1976
FR 2299237 A1 8/1976
(Continued)

*Primary Examiner* — Jason W San
*Assistant Examiner* — Rowland Do
(74) *Attorney, Agent, or Firm* — Nixon Peabody LLP; David S. Resnick; Ravinderjit S. Braich

(57) ABSTRACT

A fitting system with at least two connecting pieces that fit together. The connecting pieces comprise a male connector and a female connector simultaneously in the same part, and have additional retainers. This fitting system can be coupled to various products such as storage recipients or packages in various areas (cosmetics, foodstuffs, pharmaceuticals, etc.).

3 Claims, 5 Drawing Sheets

(58) Field of Classification Search
CPC ....... A44C 5/2066; A44C 5/2071; A44C 5/18; A44C 5/2076
See application file for complete search history.

(56) References Cited

U.S. PATENT DOCUMENTS

| | | | | | |
|---|---|---|---|---|---|
| 3,520,033 | A * | 7/1970 | Usuda | A44B 11/2588 | 24/DIG. 38 |
| 3,577,105 | A * | 5/1971 | Jones, Jr. | H01P 1/042 | 403/339 |
| 4,114,241 | A * | 9/1978 | Bisping | F16B 2/22 | 248/68.1 |
| 4,199,070 | A * | 4/1980 | Magnussen, Jr. | A47B 73/006 | 248/68.1 |
| 4,253,268 | A * | 3/1981 | Mayr | A63H 33/065 | 446/104 |
| 4,582,447 | A * | 4/1986 | Itoh | A63H 33/108 | 403/339 |
| 4,770,297 | A * | 9/1988 | Chang | B65D 85/28 | 206/379 |
| 4,947,527 | A * | 8/1990 | Hennig | A63H 17/264 | 446/120 |
| 5,015,117 | A * | 5/1991 | Pawlicki | E04G 17/02 | 249/7 |
| 5,098,328 | A * | 3/1992 | Beerens | A63H 33/08 | 446/128 |
| 5,853,314 | A * | 12/1998 | Bora | A63H 33/086 | 446/124 |
| 6,648,715 | B2 * | 11/2003 | Wiens | A63H 33/062 | 446/124 |
| 6,679,780 | B1 * | 1/2004 | Shih | A63F 9/1204 | 273/156 |
| 7,063,587 | B1 * | 6/2006 | Lin | A63H 33/086 | 446/124 |
| D544,552 | S * | 6/2007 | Lin | D21/505 | |
| 7,516,860 | B1 * | 4/2009 | Fenton | B65D 21/0204 | 215/10 |
| 7,833,077 | B1 * | 11/2010 | Simmons, Jr. | A63H 33/08 | 446/85 |
| 8,225,468 | B2 * | 7/2012 | Wanzenboeck | A41F 1/006 | 24/588.12 |
| 8,403,723 | B1 * | 3/2013 | Haner | A63B 67/007 | 446/124 |
| 8,671,640 | B1 * | 3/2014 | Thomas | E04B 2/18 | 52/607 |
| 8,801,324 | B2 * | 8/2014 | Kempf | H02G 11/00 | 403/339 |
| 9,101,185 | B1 * | 8/2015 | Greenberg | A45C 13/1069 | |
| 10,151,406 | B2 * | 12/2018 | Netke | B60R 16/08 | |
| 11,662,041 | B2 * | 5/2023 | Laughlin | H02G 3/0443 | 248/68.1 |
| 2003/0217441 | A1 * | 11/2003 | Eaton | A44B 11/25 | 24/115 F |
| 2005/0106989 | A1 * | 5/2005 | Rincover | A63H 33/082 | 446/85 |
| 2013/0333634 | A1 * | 12/2013 | Rosenquist | A01K 27/001 | 24/586.11 |
| 2015/0074954 | A1 * | 3/2015 | Pruitt | A44C 5/2071 | 24/303 |
| 2015/0129589 | A1 * | 5/2015 | Essler | B65D 81/3288 | 220/23.83 |
| 2018/0117487 | A1 * | 5/2018 | Dumphy | A63H 33/084 | |
| 2019/0127978 | A1 * | 5/2019 | Lacroix | E04C 3/06 | |
| 2019/0367216 | A1 * | 12/2019 | Kao | B65D 21/0204 | |

FOREIGN PATENT DOCUMENTS

| | | | |
|---|---|---|---|
| FR | 2574677 | A1 | 6/1986 |
| GB | 2133828 | A | 1/1984 |
| NL | 6816435 | A | 6/1969 |
| PL | 2170118 | T3 | 2/2011 |
| WO | 9947223 | A1 | 9/1999 |
| WO | 2014100875 | A1 | 7/2014 |

* cited by examiner

RECIPROCAL FITTING SYSTEM

CROSS-REFERENCE TO RELATED APPLICATIONS

This application is a 35 U.S.C. § 371 National Phase Entry Application of International Application No. PCT/BR2020/050109 filed Mar. 31, 2020, which designates the U.S. and claims benefit of BR Application No. 102019011559-9 filed Jun. 4, 2019 and BR Application No. 102019022786-9 filed Oct. 30, 2019 the contents of both of which are incorporated herein by reference in their entireties.

TECHNICAL FIELD

The present invention refers to a reciprocal fitting system, more specifically to an interlocking connection system, which comprises at least two elements or two parts that can be easily joined and separated from each other (interlocked and unlocked), in which all of the parts of said system must have at least one unit comprising a male connector and a female connector simultaneously in the same part and must ideally have similar additional retainers that are positioned inversely when connected (mirrored) and are also proposed in this application, in order to improve the fixation and stability in the fitting. The present system allows, at the same time, the disconnection of the parts at any time in a practical and efficient way, and this detachment should ideally be performed through the "pull" movement using the hands (without the use of additional tools). This new type of fitting also allows any part to be fitted in the other (universality of connection) since the connection elements must have similar spatial configuration and dimensions (characteristic that depends directly on the material used), as long as they are compatible for fitting, locking and stability, being complementary to each other (reciprocal).

This fitting system can be coupled with various products such as packaging or storage containers from different areas (Cosmetics, Food, Pharmaceuticals, etc.), equipment, appliances, machines, jewelry, tools and utensils in general, in addition to replacing the fittings commonly used in toys (interlocking blocks), furniture, floorings and ceilings, plug and socket systems, building blocks (walls modular), that is, any items that accept fitting systems even if in their previous use they did not have it, enabling the acquisition of products in modules that can be plugged into each other and even a combination of connections between different products from different areas.

BACKGROUND OF THE INVENTION

Currently, when it comes to connectors and fittings for joining items, screw connections, flange connections, grooves or some other type of element that provide retention are known. Connection elements via pressure fitting are also known and are usually made of plastic or other rigid material such as wood, consisting of a male and a female part, each of which contains only one part of the connection separately, that is, each piece has only the male part or only the female part in a non-simultaneous way, which fit together by pressure. Eventually, when there is an additional retention, it is present in only one of the parts to be connected.

Fittings of the male and female type are usually used in ceilings, floors, in which the blades contain on their internal faces a ribbed projection male, and the other ribbed projection female, which make the connection of said blades for better resistance of the ceiling. There are also locking systems made by angled male and female inserts, in locking plates and "clamps", cut on another plate, which are coupled to the horizontal cuts of the other plates through pressure exerted on it.

Constructive arrangements that use the male and female method such as sockets and couplings, are made up of two parts, one of which has holes and the other has protruding pins.

However, most of the male and female fitting products or systems known in the current technique status present one of the parts only with the female part and the second part only with the male part, that is, they do not have simultaneously a male and a socket female in the same part, the way it is being proposed by the present invention nor present complementary retentions in each fitting part as it is being proposed. So that for an effective locking, the size of the connectors is much larger than the proposed system and, in the case of the addition of additional commonly used retentions, these are used with the purpose of increasing the fixation of the connection, however, without presenting a disconnection facilitated compared to this new proposed form given its stability of connection strength. The simultaneous presence of the male connector and the female connector forming a set in each part to be joined as proposed in this application also allows universal fitting since all parts used in this system (with the appropriate specifications for size, shape, juxtaposition and others configurations mentioned) present the novelty of joining each other regardless of the type of connector—male or female—and, they can also allow the universality of direction of the parts when more than one set of connectors is present in one of the parts to be connected, differently from what occurs in previous fitting systems. Thus, despite using basic knowledge of Physics, this simple invention solves problems and/or some limitations of everyday life (which are best exemplified in the description of LEGO® type blocks and in the cosmetic packaging).

Another disadvantage of the current male and female systems is that they do not guarantee such a stable fixation compared to this new system, especially in cases where there is a need for quick and easy detachment. Such a need is even more evident in the parts that need to be assembled and disassembled repeatedly, and that tend to break or loosen, limiting the connection only to the fitting, making repetitive disassembly impossible or difficult, either due to inefficiency or impracticality of the plug and unplug function. And, in the case of some objects that are connected by these existing male-female connections, there is a limitation of the direction of the fitting, as for example in the LEGO® fitting blocks, which can only be stacked one piece above the last piece so that the shoulder part (male part) is exposed for a new fit of the female part. In models like this or similar to these toy blocks, the system proposed in this application can reduce the number of connectors (male-female assemblies) and still present greater retention in the fitted parts compared to existing models. The holding strength is so stable that in cases of small height pieces that ideally a small opening or crack should be present serve as a support for the finger in order to facilitate the disengagement of the pieces. For example, while in traditional LEGO blocks, 8 connectors are placed (8 male and female connectors) to obtain a retention, just a set of 6 connectors of the proposed fitting system is sufficient. This greater retention stability is fundamental for the assembly of toys used in robotics/automation programming, for the assembly of prototype structures, especially the automated ones that are being used by the industry in general and, in the same way, the final result can be very compromised by inadequate retention.

In this sense, the differentials presented by the present invention are especially important with the purpose of providing that objects that previously did not have any fitting system, will have this possibility, especially in small objects. Another example of the benefit of the proposed invention in small objects is in the cosmetics segment, since several products such as lipsticks, mascara, eyeliner or other cosmetics, are commonly packaged in tubular/cylindrical packages with double compartments made in a single object called duos. The problem of these duos is that they do not have a connection between one cosmetic and the other or do not have an effective connection precisely because of the lack of an efficient fitting system and that, in this way, do not allow the consumer to choose the product(s) of their preference to compose the duos, forcing him to purchase two products when the need is to purchase only one.

For the cosmetic duos to be connected using this new system, it is necessary that at least one set of connector (as proposed) is inserted in one end of each cosmetic package to be connected, whether it is the cover or the base or the body of the packing. If only one set of reciprocal connector is inserted in the packaging of each cosmetic to form the new duo, this connector set should ideally be placed on its base so that when connected to another packaging, its application is facilitated by the fact that the products are already in position of use, requiring only the removal of the cover that protects the product so that it can be used, as in the use of lipstick, for example. In this way, these new duos remain with the 2 fronts of application free to use, as already occurs in the existing duos (even if the commonly used dues do not have connection). For liquid cosmetic products, in which a brush or other applicator is internally attached to the lid, it is also recommended that they are connected by their bases (with the connector sets on the base) to form these new pairs, so that the covers are facing the ends, that is, remain in the most practical position to use the products. Thus, the present invention really adds another possibility in the way of consuming beauty products, since it does not alter the consumer's usual form of use.

For these proposed cosmetic duos, another ease of application of the product is achieved, obtained through the connection with the packaging of the other product that forms the duo, which now serves as an extension for hand support, an especially important aspect in small packaging sizes. Also, if the package has 2 reciprocal connector sets in its outermost parts (cover and base), the cover itself can be used as a finger support extension in the case of the individual application of the product (package without being connected to another), besides avoiding the loss of the cover itself.

Another important possibility in the area of cosmetic products is the insertion of this new connection system in the traditional tubular/cylindrical packaging of products such as lipstick and mascara for the formation of kits that connect any product with another of any material through its new connector packaging with reciprocal system. These kits can be formed by more units than the duos, they can, for example, be formed by five or six units, and the number of units depends on the size of the product packaging (mainly the length), since the dimensions directly interfere on the stability of the set.

The present invention also provides easy disconnection of packaging at any time, whether at the time of purchase or for a specific use in the case of products that have already been purchased, (quickly and ideally without tools, as already mentioned). This means that it is capable of transforming cosmetic kits—or other products—from larger units into kits with fewer units, or even allows total disconnection so that each product can be used individually, that is, it allows any random combination of disconnection and new connection for a new kit, for example, the transformation of a kit of 5 units into 1 duo and another kit with 3 units that can again be transformed into a kit with 4 units and 1 single use package or any combination that is more convenient for the user.

In addition, through this new system, there is the important possibility of 2 types of use for the products of the cosmetic kits (pharmaceutical or other products) connected to each other through their packaging, that is, the products positioned at the ends of the connected kits due to their tubular packaging, they can face the 2 outer ends of this kit, using the same principle described by the new cosmetic duos formed from this invention. Through the known fitting systems, only one type of application of cosmetic products that use kits connected in their packaging is allowed, which significantly hinders its use in practice because, depending on the product (lipstick, for example) there is the need to invert the position of the packaging in the kit for each use or there is the need to use the product individually, which may lose it in the case of small units, especially if they are used for quick makeup (like a quick application in the car while waiting for the traffic light to open). Thus, this invention solves this failure in the traditional fitting system, which does not allow the universality of the meaning of the product contained inside the packages.

Technically, as already reported, to obtain this new condition with the proposed fitting system, simply place a standardized connector set in size and shape (according to specifications already described in this system) at the end of the lid and another at the base of the cylindrical packaging of the cosmetic products without the need of an additional connector piece to be placed between the packages of the kits formed to change the direction of the product. Another possibility for these kits of cosmetic products or other products with cylindrical/tubular packaging with a plug connector on the lid and another one on the base that have the 2 application fronts through the existing plug systems is the making of 2 connector packaging models: the first model with the male connector on the base and another female connector on the cover (simultaneously in the same package) and the second model of packaging with the female connector on the base and the male connector on the base (also with 2 connectors present simultaneously) for the same product, which considerably increases the cost of production due to the need to manufacture 2 types of packaging for each product, making it unfeasible compared to the solution proposed by new system. In order to have the possibility of using an additional central connector part so that these kits present the 2 types of application of the products, other issues are also inconvenient, such as the need to manufacture an additional part that would generate costs for the manufacturer and for the users, in addition to prejudice the overall length of the kit that can be a fundamental requirement in terms of stability and storage in the bag. Therefore, the two solutions for traditional plug-in systems prove to be inefficient and/or costly when compared to the proposed system, which has the greatest intention of technically resolving the issue of efficient and facilitated connection and disconnection to generate a new form of consumption that enables to acquire the products that are needed/desired independently of others, which currently does not happen with makeup and other products.

Regarding the current technique status, the problem detected is the lack of practicality for the user, the safe and stable closure of the packaging and the lack of possibility of easy insertion and detachment of various objects continuously and the lack of universal insertion (standardized connections enable fittings between objects in the same areas or even from different segments, and also solve the direction of product position using only the proposed system depending on the number of reciprocal connector sets inserted and their positions.

BRIEF SUMMARY OF THE INVENTION

The present invention is a safer and more reliable connection system for parts and objects, regardless of the shape of the objects where the connecting elements will be fixed, in addition to the possibility of more frequent disconnections without damage to the system. The present fitting system provides greater stability in retention when the parts are attached, without, however, making disconnection difficult. More than that, the present invention allows not only the fitting of two pieces, but allows connecting several items, whether they are of the same type/segment or are from different areas, using the same connection system, that is, the connection is universal. Product packaging can be manufactured with connectors already attached to them, or connectors can be manufactured and embedded in the product packaging, such as food, medicine, lipsticks, pencils, plug-in toys, equipment, appliances, machines, plugs systems and sockets, jewelry, tools and utensils in general, furniture, floors and ceilings, constructions, that is, in any items that accept fitting systems, even if they did not use any type of fitting.

Thus, when using this fitting system, a new use function will be added to the product, in addition to creating a new consumption model that allows grouping or connecting several products, whether they are in the same category or not. Thus, the present invention makes possible a new modality of more sustainable and intelligent consumption, since it allows the use of a product individually and in small volumes/quantities, as is the case of cosmetics, medicines or other products that usually are sold in larger quantities or linked to another product. Thus, the present invention allows more than one item to be connected to another through the use of packaging that makes use of said connectors, which is an important facilitator, especially for products such as cosmetics and medicines.

According to the modality of the invention, it can have at least one set composed of two connector elements, being a male shoulder connector and a female cavity connector in several formats, provided that they have similar sizes and spatial configuration and are complementary to each other, with the male coupling being less than half the distance from the fitting (FIG. 9*d*), the fitting and locking of the connected parts-which directly depends on the properties of the materials used so that when a connector set is fitted to another set of another part, they are in juxtaposed manner, fitting perfectly between themselves keeping the set of connectors locked stable when connected to each other. The materials that make up the proposed connector sets can be metals or metal alloys, wood, various types of polymers (plastics, rubberized materials such as silicones) and other materials that meet the features of this fitting system. The set of connectors can be inserted in the manufacture or attached to the desired objects and can be exposed only when required for use (push button system).

If manufactured together with the product to be connected, the connector is made of the same material or compatible material that adapts to the configuration and size of the object/packaging to be connected. The manufacture of the product already containing the connector is advantageous because the set (product and connector) is in continuity, without amendments and without the need to be coupled, just being made a plastic injection mold specific to the existing product for the plastic is injected, forming a single piece.

If the connector is not made together with the object, the present fitting system can be attached to the packaging or product that does not have any type of connection. The connector can be fixed to the object, glued or just fitted, and this fixation should ideally have a holding force higher than the set of connectors, in order to avoid the detachment of the connectors to the objects. The attachment of the connector to the object will depend on the configuration and material of the object, as well as its external packaging. Thus, the fixation of this system to an object can take advantage of the object's own configuration as recesses (cavities) of the parts in which the connectors will be fitted, to increase the holding force between the object and the connectors, so that the object's surface must be in juxtaposition with the internal surface of the connector set. Features that increase the holding force between the object and the proposed connector can be added, such as, for example, small cavities made by wear or sandblasting on the object's surface, even though this feature only serves to roughen the surface of the part and help fixing through gluing.

DESCRIPTION OF THE SEVERAL VIEWS OF THE DRAWING

The description that follows seeks to highlight the proposal and its principle, without being limited to the drawings or components mentioned, having as reference the following illustrations listed below:

FIGS. 1, 2 and 3: show the male and female fittings in a semi-circular shape.

FIG. 5/A: shows the additional retainer of the parts when coupled;

a: measure of the coupling/shoulder or male lock≤d/2 b: angle of the inner wall (k) of the female coupling=0.1 degree to 85 degrees;

c: angle of external wall compensation=0.5 degrees to 85 degrees;

d: fitting measures=a+a' e: external distance d=2 h f: depth of fitting/coupling or female cavity≥d/10;

f: height of the male socket≤f, and cannot be less than f/2 g: measures of the fit in the body≥d;

h: overall thickness, depending on the material strength and connector dimensions i: height of fitting in the body≥d/10;

k: internal wall of the female coupling

Figure 10:
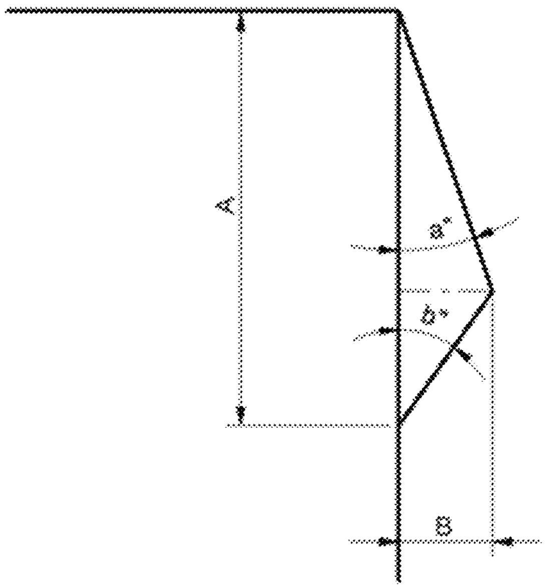
Figure 11A:
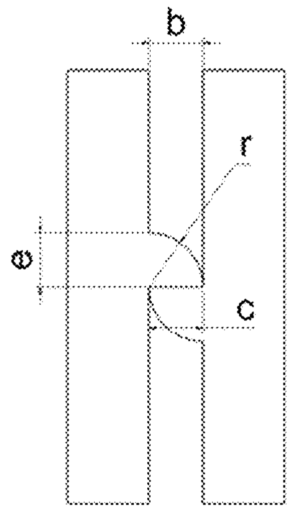
Figure 11B:
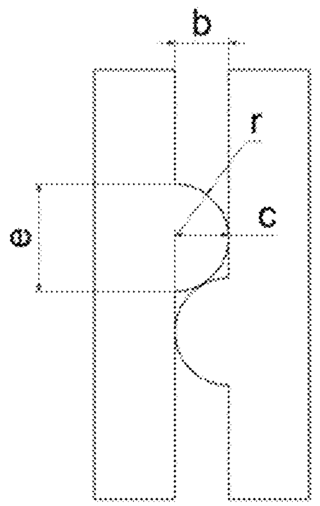
Figure 11C:
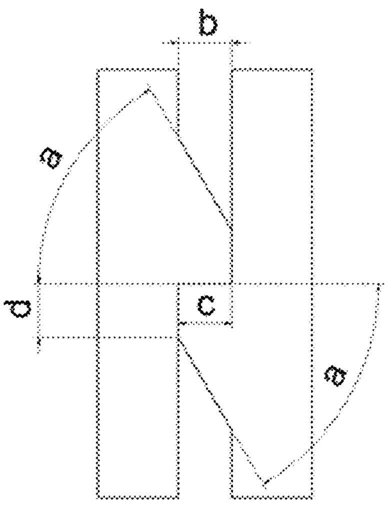
Figure 11D:
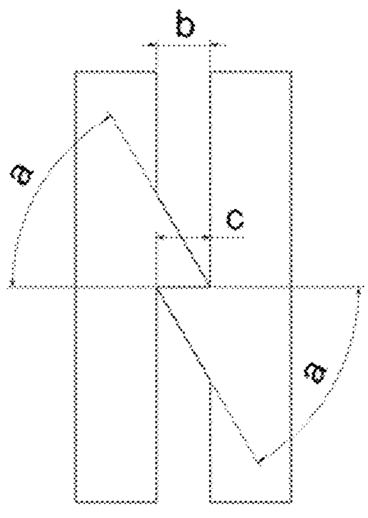

FIG. 10: shows a model of the additional retainer that is attached to the inner side of each male and female coupling, in a triangular shape, being able to adopt other shapes, such as: trapezoidal, with the measures below:

FIG. 10/A: shoulder length

FIG. 10/B: shoulder height

FIG. 10/a": entry angle

FIG. 10/b": exit angle

FIG. 10: the entry angle a"≤to exit angle b"

FIG. 11: show additional retainer measures in different formats:

Subtitle a=shoulder angle b=space between walls c=shoulder height d=face parallel to the shoulder e=Shoulder length r=arc radius

FIG. 11/A b>0 c=½ b a b c≤r e≥c r>0

FIG. 11/B b>0

C=½ b a b c≤r

2c≤e r>0

FIG. 11/C a=45° to 89° b>0 c=½ b a b d>0

FIG. 11/D a=45° to 89° b>0 c=½ b a b

DETAILED DESCRIPTION OF THE INVENTION

Figure 1:
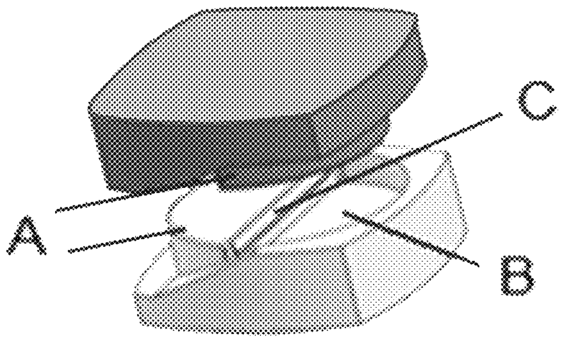
FIG. 1: shows a modality of the connection element in which the male coupling (A), female coupling (B) conformations and the additional retainer in a triangular shape (C) are present.
Figure 2:
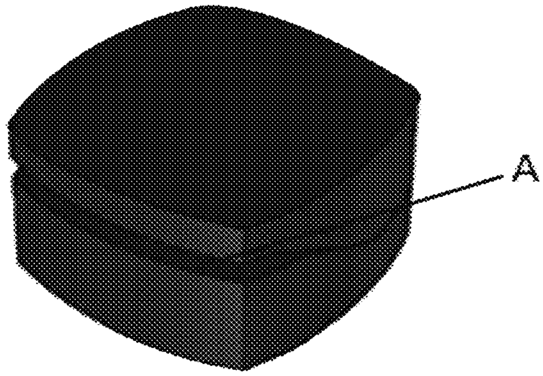
Figure 3:
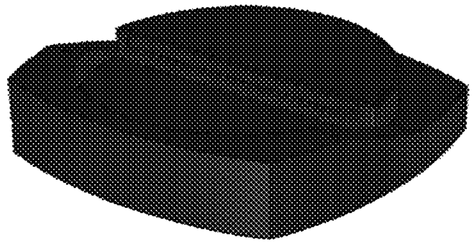
Figure 4:
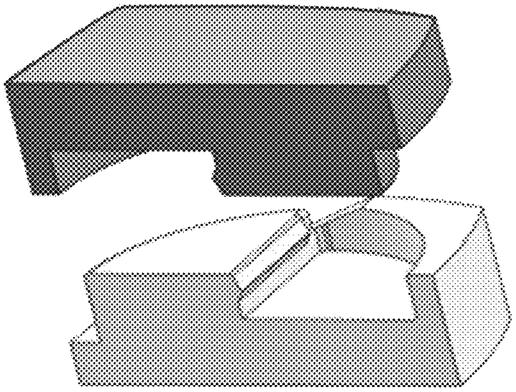
FIGS. 4, 5 and 6: show the sectional view of the separated and fitted pieces, with an opening to facilitate the disengagement of the pieces.
Figure 5:
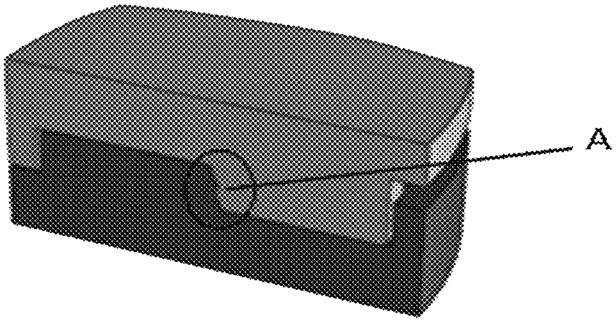
Figure 6:
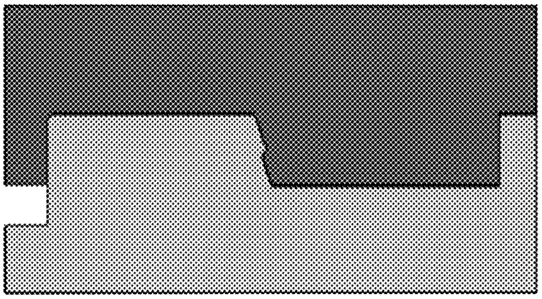
Figure 7:
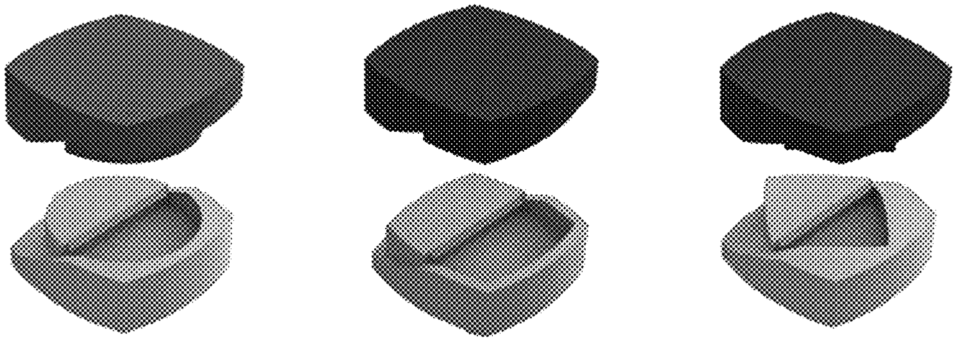
FIG. 7: shows the perspective views of the connector parts in different formats of the male and female couplings, or of the parts of the fitting system.
Figure 8:
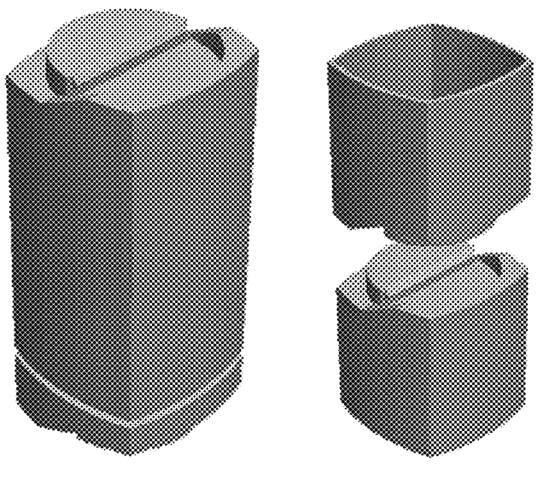
FIG. 8: shows the fitting system attached and detached to objects of varying sizes.

As shown in an embodiment of the system (FIG. 1), each one of the connector parts has the same geometric shape of the shoulder or projection (male part—FIG. 1/A) and of recess or indentation (female part—FIG. 1/B) in the same piece, an additional retainer (FIG. 1/C), which can be presented in several formats, such as, for example, in the semi-circular shape (FIG. 2-3), or in other geometric shapes as exemplified in FIG. 7 or still others than those illustrated, provided that the two parts (male coupling and female coupling) are similar in size and spatial configuration, with the male coupling being equal to or less than half the distance of the connector (FIG. 9*d*) and having equal height or less than the height of the female cavity (FIG. 9*f*), that is, the male connector must have dimensions compatible with the female cavity as long as the fit, locking and stability of the connected parts are preserved—which directly depends on the properties of the materials used, making that the protrusion of one fits into the recess of the other, so the grooves are reciprocal and, due to the standardization of size and shape for a given object, it also makes it universal, a characteristic that enables the combination of different types of objects.

The fixing of the connection by pressure becomes impermeable since the first part assumes a conformation according to the base and shape of the second part, which causes a good seal and keeps the parts effectively fixed to each other, mainly necessary in parts of large size or connecting multiple items. That is, the recess of one of the parts fills the space in which the shoulder of the other part to be joined will be applied, in which the external measure of the boss (male coupling) corresponds to the internal measure of the second corresponding part (cavity of the female part). Another advantage of the present system is the stability and firmness of the connection with a reduction in the height of the connector element (height of the shoulder and recess) compared to the current fitting systems, since the system has both the male and the female part in each part, bringing benefits of practical use so that more objects can be connected with efficiency, even those that had no previous connection system, besides having the advantage of significant reduction in the amount of raw material used, compared to the current plug-ins systems. The additional retention can be dispensed depending on the size and material of the connectors, being necessary for connectors with reduced dimensions when compared to the existing models.

The present invention can be assembled and disassembled manually, without the need for specific tools, screws or fixing pins, in addition to being highly intuitive for use (snapping movement and "pull-out").

Due to the effectiveness of the retention of the reciprocal fitting system, a slit/opening or some type of structure may be present in the part to be connected/disconnected to support the fingers and facilitate the disengagement in order to avoid the need for disengagement using tools (FIG. 2/A) as in the case of plug-in blocks where the height is especially small for handling when using only your hands. For slightly larger objects such as cosmetic products, the packaging body is usually large enough and dispense the need of slits/fingers.

In accordance with that illustrated by FIGS. 1 to 8, the present invention entitled "Reciprocal Fitting System" was developed in order to solve multiple problems currently faced by the state of the art.

In one of the possible representations, the present invention comprises two or more connecting pieces (FIG. 1) with each piece (male coupling—FIG. 1/A) having a shoulder with a shape and size similar to the recess (female coupling—FIG. 1/B) with the hollow internal part of the body, where the male coupling will be coupled. The spatial configurations (size and shape) of the male and female couplings must be compatible for fitting, locking and stability. The connection stability between parts is possible because it contains an additional retainer coupled to the couplings, as the reciprocal additional retentions proposed in this Patent Application.

Figure 9:
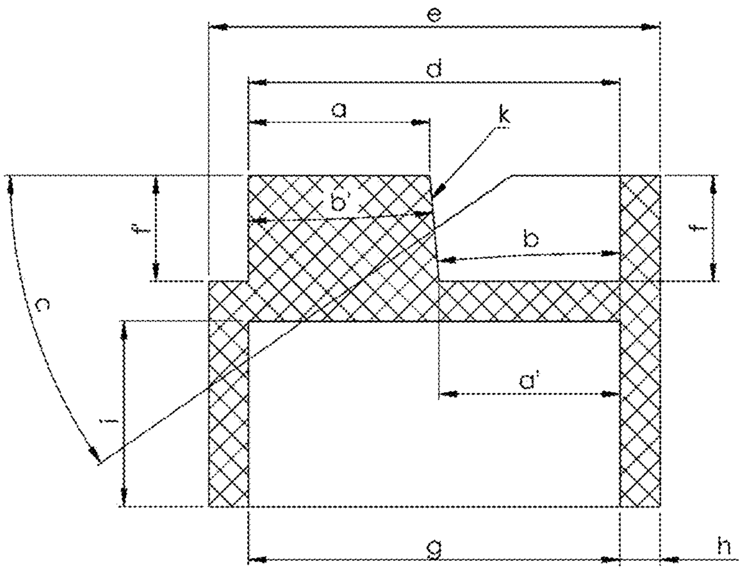
FIG. 9: shows a model of the connection element seen in side section, with the slit/opening to facilitate the disconnection, without the additional reciprocal retainers, and the measures that compose it serve as a basis for other objects with applications of physical principles of the Reciprocal Fitting System.

The female coupling, which is hollow inside, has the following measures: angle of the inner wall (k) between 0.1 degree to 85 degrees (FIG. 9/b); depth equal to or greater than d/10 (FIG. 9/f). This female coupling acts as a base for the coupling of the male coupling of the second part, in addition to acting on the sealing of the coupling system.

Consequently, the male coupling has compatible measures (with the female coupling/cavity): measure equal to or less than d/2 (FIG. 9/a); angle of the external socket between 0.5 degrees to 85 degrees (FIG. 9/c).

In this representation, the base of the connector part corresponds to a+a', that is, it is the sum measure between the internal walls of the female cavity added to the measure of the male coupling (Note: the total width of the male connector includes the width of its external walls) (FIG. 9/d); the external distance of the connector piece is equal to (d+2h) (FIG. 9/e); distance from the piece is equal to or greater than d (FIG. 9/g) and height of the fitting is equal to or greater than d/10 (FIG. 9/i).

The proposed additional retainer is an important complementary feature to the fitting system, as it results in a more stable connection, without causing disconnection difficulties. Despite being extremely small compared to the size of the connectors, the additional retainer is especially important to reduce the amount of raw material in the connectors and serves to easily correct the smallest measures necessary to ensure the stability of the fit of materials such as plastic that would have connections inefficient in practice, making its use unfeasible and may even cause the loss of products that would be united by this connection. A possible spatial representation is shown in FIG. 7 in triangular, semicircular or trapezoidal formats, located on the internal side of the male connector coupling FIG. 8 with different sizes. The proposed reciprocal additional retainers are pairs, with similar sizes and spatial configuration and inversely positioned on the internal side of the male coupling. The additional retainers are different from the retainers of the current state of the art, as they are not presented in pairs (they are presented in only one of the pieces) and, this does not have the same advantages and specificities mentioned. Each of the complementary retainers must be in the opposite position of their respective pair of the part to be connected and serves to fit the second part.

Positioned on the inner wall of the male coupling, the additional retainer can be presented in several formats, such as triangle, semicircular, trapezoid (FIG. 11) that will fit the second piece made of rigid material such as plastic, wood, metal, resins and even flexible materials such as silicone and rubber, with the measures presented according to FIG. 11.

The variation in the angles of the reciprocal retainers (fitting and disengagement angles) is large due to the fact that they are directly related to the material used, the geometry of the retentions (semicircle, triangle, etc.) and the size of the measurement correction that is necessary for the reciprocal fitting system to be effective in its holding force and ease of disconnection (without tools), as recommended by the principles of this system.

Thus, such constructivity allows the fitting between the male coupling and the female coupling, and this additional retainer serves as a safety and stability lock and facilitated disconnection, due to the fact that the following relationship is respected: the fitting or entry angle is at least equal or smaller than the disengagement or exit angle, in addition to following the specifications of the relationship of the geometries reported in each case. For example, if the entry angle is 30 degrees, the exit angle must be at least 30 degrees or a little higher, so that the disconnection is facilitated and at the same time there is a kind of barrier that prevents unintentional disconnection and causes greater stability of connection to the system.

The objects that must be fitted and detached more frequently, must have the inclination of the said retainer for the fitting equal or slightly softer than the inclination of the wall for the fitting. The retaining release wall should be slightly more accentuated to prevent attached objects from loosening easily, but at the same time to facilitate disconnection without the aid of tools. The retainer works as a kind of ramp that can have rounded angles like the semicircle shape, adapting the angles for each material and object. As the object requires greater strength and retention stability in the fitting, the shape and configuration of the retainer can be of a scalene triangle, a trapezoid with different angles, equilateral triangle or other conformation such as the drawings and correlated measures in FIG. 11 according to the material used and need for disconnection more or less facilitated. The proposed fitting system has the ability to connect to various parts, as long as the fitting of the pieces is correctly positioned so that the male fitting is coupled to the female fitting and vice versa. Then, the same procedure is performed on the second part to be connected and so on. Once the connector parts are attached to the desired products, the two ends of the connector parts are manually inserted, until the male and female coupling are engaged, ending with the additional retainer lock for greater stability in the fitting.

What is claimed is:

1. A reciprocal fitting system with at least two connecting pieces that reciprocally engage together without a magnetic element, wherein each connecting piece comprises one male semicircular shoulder and one female semicircular recess in the connecting piece, and an additional retainer is protruding from an internal wall of the male shoulder; and wherein the additional retainers are provided and engaging as a pair in a triangle, semicircular or trapezoid format, with similar sizes and spatial configuration while inversely positioned on the respective internal walls of the male shoulders of the connecting pieces.

2. The reciprocal fitting system, as defined in claim 1, wherein the connecting pieces are made from wood or rubbery materials.

3. The reciprocal fitting system, as defined in claim 1, wherein each connecting pieces is embedded in a product packaging.

* * * * *